Figure 1:
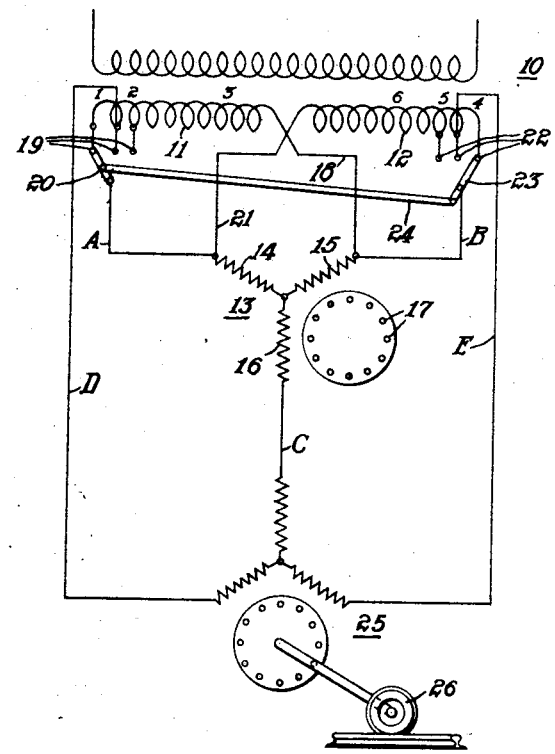

Jan. 15, 1924.

C. LE G. FORTESCUE 1,480,713

PHASE CONVERTER SYSTEM

Original Filed Nov. 16, 1918

WITNESSES:
H. J. Shelhamer
O. B. Buchanan

INVENTOR
Charles Le G. Fortescue
BY
Wesley G. Carr
ATTORNEY

Patented Jan. 15, 1924.

1,480,713

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-CONVERTER SYSTEM.

Original application filed November 16, 1918, Serial No. 262,809. Divided and this application filed February 5, 1921. Serial No. 442,766.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase-Converter Systems, of which the following is a specification, this application being a division of my application Serial No. 262,809, filed November 16, 1918.

My invention relates to phase-converting systems and particularly to means for compensating for the impedance electromotive forces of the converter. My invention is particularly adapted for railway systems in which single-phase energy is distributed through the trolley conductor and converted, on the locomotive, into polyphase energy for energizing the driving motors.

It is well known that, if a polyphase induction motor or synchronous motor having a good damper winding is connected to a single-phase line, polyphase electromotive forces will appear at the terminals of the motor. It is also well known that the phases which are not connected to the single-phase line will be somewhat displaced in phase position and reduced in amount by reason of the impedance of the converter.

The patent to B. G. Lamme, No. 1,243,430, granted October 16, 1917, and assigned to the Westinghouse Electric & Manufacturing Company, discloses a system for compensating for the impedance electromotive forces of the converter by providing the single-phase transformer winding with taps whereby the induced or tertiary electromotive force of the converter may be displaced with respect to the phase which is connected to the single-phase source. In order to avoid discontinuity in the power supply, while shifting from one tap to another, in the above mentioned system, it is necessary to employ preventive coils, such as are disclosed in the patent of Simmon and Hall, No. 1,232,863, granted July 10, 1917, and assigned to the Westinghouse Electric & Manufacturing Company.

It is the object of my invention to avoid the necessity for preventive coils by utilizing two single-phase transformer windings connected in parallel, the connections being so arranged that, when the contactors are disengaged from the taps in passing from one tap to another, the single-phase coils will be connected in series with the converter in such manner as to, in effect, reverse the phase sequence of the polyphase electromotive forces.

The series connection of the phase converter constitutes the subject-matter of a copending application of Lewis W. Chubb, Serial No. 206,921, filed December 13, 1917, and assigned to the Westinghouse Electric & Manufacturing Co. In the series system of conversion, the impedance electromotive forces of the converter are combined with the polyphase electromotive forces in such manner that symmetry is not disturbed.

It is, therefore, an object of my invention to produce a shunt phase-converter system in which the transformer tap connections may be shifted to maintain the polyphase electromotive forces in substantially balanced condition without the use of preventive coils.

Other objects, as well as details of construction, of my invention will be apparent from the following description and accompanying drawings, wherein:—

Figure 2:
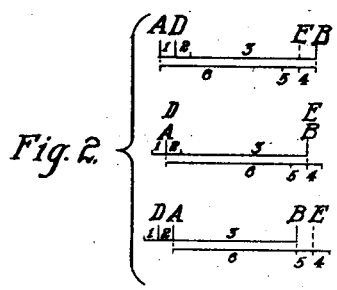
Figure 3:
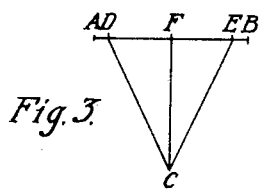

Figure 1 is a diagrammatic view of a phase converter connected in accordance with my invention, whereby the magnitude of the tertiary electromotive force may be adjusted, Fig. 2 is a series of vector diagrams for the various positions of the adjusting devices, and Fig. 3 is a vector diagram showing the terminal polyphase electromotive forces corresponding to the first position of the adjusting devices.

In the embodiment of my invention shown in the drawings, I provide a single-phase transformer 10 having two secondary windings 11 and 12. My phase converter is shown at 13 as a three-phase induction motor having main primary windings 14 and 15, an auxiliary primary or tertiary winding 16 and a secondary winding 17, shown as being of the squirrel-cage type.

One terminal of the transformer winding 11 is connected, by means of a conductor 18, to the phase-winding 15 of the converter. The other terminal of the transformer winding 11 is provided with a plurality of taps 19 to which the phase-winding 14 is selectively connected by means of a conductor A and a switch-arm 20.

In like manner, one terminal of the transformer winding 12 is connected, by means of a conductor 21, to the phase-winding 14, and the other terminal of transformer winding 12 is provided with a plurality of taps 22 to which the phase-winding 15 is selectively connected by means of a conductor B and a switch-arm 23. The switch-arms 20 and 23 may be connected to move in opposite directions by means of a connecting link 24.

The center taps of groups 19 and 22 are connected to phase conductors D and E, respectively, of a three-phase load circuit, the other phase conductor C of which is connected to the tertiary winding 16 of the converter. The load is indicated in the drawing as comprising an induction motor 25 which is connected to the driving wheel 26 of a locomotive.

When the motoring load is increased, it is desirable to increase the single-phase electromotive force supplied to the phase converter, as compared with the corresponding electromotive force supplied to the load circuit, in order to overcome the voltage-drop in the tertiary voltage of the converter. During recuperation, however, it is desirable to reverse the process in order to maintain balanced polyphase conditions.

When the switch-arms 20 and 23 are in engagement with taps 19 and 22, the single-phase windings 11 and 12 are connected in multiple. When the switch-arms are moved from one tap to another, they are, for a moment, entirely disengaged from the taps. Under the conditions just mentioned, the coils 11 and 12 are connected in series between the phase-windings 15 and 14 and the polyphase load conductors D and E, respectively. The effect of the series connection is to add a single-phase electromotive force to the induced electromotive force of each of the phase-windings 15 and 14, making the resultant electromotive force in each case equal to the induced electromotive force in the other of said phase windings.

It will be observed that, when the phase converter is operating as a shunt-connected machine, the winding that is connected to the single-phase source has an induced electromotive force which is substantially equal and opposite to the single-phase electromotive force. The corresponding phase of the load is connected to the single-phase source and, therefore, the polyphase electromotive forces which are impressed upon the load, through the conductors D, C and E, has a phase sequence opposite to the phase sequence of the induced electromotive forces of the converter.

When the converter operates as a series-connected machine, the polyphase electromotive forces which are impressed upon the load still have a phase sequence opposite to that of the induced electromotive forces in the converter, as above pointed out. It is, therefore, clear that, during the transition periods, when the switch-arms 20 and 23 are moving from one tap to another, the converter continues to supply polyphase energy, in the same phase sequence, to the load.

The operation of the above-described apparatus will be more readily understood by reference to Fig. 2. The various sections of the single-phase coils are numbered from 1 to 6 in Fig. 1, and the voltage vectors are correspondingly numbered in Fig. 2. Vectors are drawn for each of the three positions of the switch-arms 20 and 23. In the first position, which corresponds to motoring conditions, the single-phase electromotive force A B, which is supplied to the converter, is greater than the corresponding electromotive force D E of the load, as shown in Fig. 1 and in the top set of vector diagrams in Fig. 2. In the second or central position of the switch arms 20 and 23, which corresponds to light-load conditions, the single-phase electromotive forces applied to the converter and to the load are equal, as indicated in the middle group of vectors in Fig. 2. In the third or remaining position of the switch arms, which corresponds to regenerative operation, the converter receives a smaller single-phase electromotive force than the load, as indicated in the bottom group of vectors in Fig. 2.

In Fig. 3, I have indicated the tertiary electromotive force vector C F, which bisects the vector AB and which is equal to approximately 0.866 times AB. It will be seen that the manipulation of the switch-arms 20 and 23 will vary the magnitude of the induced tertiary electromotive force of the converter, to compensate for the impedance voltage of the windings. It will also be understood that, if the voltage AB is increased beyond the amount necessary to account for the impedance voltage of the windings, the load voltage may be increased at the expense of the balancing of the system.

While I have shown a preferred embodiment of my invention in the appended drawing, I do not wish to be restricted thereto, but I desire that only such restrictions shall be placed upon my invention as are set forth in the appended claims.

I claim as my invention:

1. The combination with single-phase windings and a polyphase circuit, of a phase converter connecting said windings to said circuit for interchange of power, said windings being provided with taps whereby the voltage applied to the converter may be varied with respect to the voltage applied to the polyphase system, switch-arms for selectively engaging said taps, and connections whereby said converter operates as a shunt-connected machine when said switch-arms are in engagement with said taps and whereby said converter operates as a series-connected machine during the transition period in which said switch arms are disengaged from said taps in passing from one position to another.

2. In a phase-converting system, the combination of a polyphase dynamo-electric machine adapted to operate as a phase converter, a pair of single-phase transformer windings, a polyphase translating device, connections whereby said single-phase windings are connected in parallel to operate said converter as a shunt-connected machine, said connections including taps for varying the single-phase electromotive forces applied to the converter with respect to the single-phase electromotive forces applied to the translating device, switch-arms for selectively engaging said taps, and connections whereby said single-phase windings are placed in series with the converter when said switch-arms are out of engagement with said taps.

3. In a system for converting from single-phase power to polyphase power, or vice versa, the combination with a converter having primary, secondary and tertiary windings, of a pair of single-phase windings connected in parallel, connections for connecting said single-phase windings in series with the respective terminals of said primary converter windings, a load circuit adapted to be connected to the outer ends of said single-phase windings and to said tertiary converter windings, the outer ends of each of said single-phase windings being provided with taps, and switch-arms connected to the terminals of the primary converter windings and adapted to engage said taps, whereby the converter will operate as a shunt-connected machine when said switch-arms are in engagement with said taps and whereby said converter will operate as a series-connected machine when said switch-arms are in intermediate positions between said taps.

4. The combination with single-phase windings and a three-phase circuit, of a phase converter connecting said windings to said circuit for interchange of power, said windings being provided with taps whereby the voltage applied to the converter may be varied with respect to the voltage applied to the three-phase system, switch-arms for selectively engaging said taps, and connections whereby said converter operates as a shunt-connected machine when said switch-arms are in engagement with said taps and whereby said converter operates as a symmetrically connected series-converter machine during the transition period in which said switch arms are disengaged from said taps in passing from one position to another.

5. In a phase-converting system, the combination of a polyphase dynamo-electric machine adapted to operate as a phase converter, a pair of single-phase transformer windings, a three-phase translating device, connections whereby said single-phase windings are connected in parallel to operate said converter as a shunt-connected machine, said connections including taps for varying the single-phase electromotive forces applied to the converter with respect to the single-phase electromotive forces applied to the translating device, switch-arms for selectively engaging said taps, and connections whereby said single-phase windings are placed symmetrically in series with the converter when said switch-arms are out of engagement with said taps.

In testimony whereof, I have hereunto subscribed my name this first day of February, 1921.

CHARLES Le G. FORTESCUE.